Nov. 19, 1929.  J. DOLPHIN  1,736,649
AUTOMATIC CONTROL APPARATUS FOR GAS BURNERS
Filed Feb. 9, 1928

INVENTOR
James Dolphin
BY
ATTORNEY

Patented Nov. 19, 1929

1,736,649

UNITED STATES PATENT OFFICE

JAMES DOLPHIN, OF HAMPTON-IN-ARDEN, ENGLAND, ASSIGNOR OF ONE-THIRD TO HARRY JAMES YATES, OF LONDON, ENGLAND, AND ONE-THIRD TO M. HOWLETT & COMPANY LIMITED, OF BIRMINGHAM, ENGLAND, A COMPANY OF GREAT BRITAIN

AUTOMATIC CONTROL APPARATUS FOR GAS BURNERS

Application filed February 9, 1928, Serial No. 253,157, and in Great Britain May 24, 1927.

This invention relates to automatic control apparatus for gas burners and refers more particularly to that type of apparatus which includes a regulator valve which can be set to any required opening by hand and is subsequently controlled by means of a thermostat for the purpose of keeping the temperature of the oven or its equivalent substantially constant.

In apparatus of this type as hitherto made it has been found necessary or desirable to arrange the thermostat from side to side of the oven, the thermostat projecting through one side of the oven into a valve box and acting directly upon the valve stem which is in alignment with the thermostat. With this arrangement the setting means for the regulator valve which usually consists of a rotary head suitably calibrated, is also concentric with the thermostat so that the face of the rotary head is at the side of the oven.

The primary object of the present invention is to provide an arrangement which will allow of the face of the rotary head forming the setting means for the regulator valve to be brought into a more convenient position, i. e. either facing the front of the oven or facing upwardly, so that the figures or marking thereon can be seen more clearly and the head may be operated more conveniently than hitherto.

According to the present invention the valve stem is arranged transversely with respect to the thermostat so that the calibrated rotary head which forms the setting means, or any other setting means which may be employed, can be brought to face the front or top of the oven, a mechanical connection being interposed between the thermostat and the valve stem so that the movements of the end of the thermostat are accurately transmitted to the valve stem.

The mechanical connection between the thermostat and the valve stem may take the form of a number of balls such as are used in ball bearings or other rotary members may be used, these members being placed in a part circular or other curved race or guide, one end of the row of balls being engaged by the thermostat end and the other end of the row of balls engaging the end of the valve stem or a member associated therewith.

Alternatively, any other convenient form of mechanical connection may be interposed between the end of the thermostat and the valve stem such, for instance, as a bell crank lever.

Referring to the drawings:—

Figure 1:
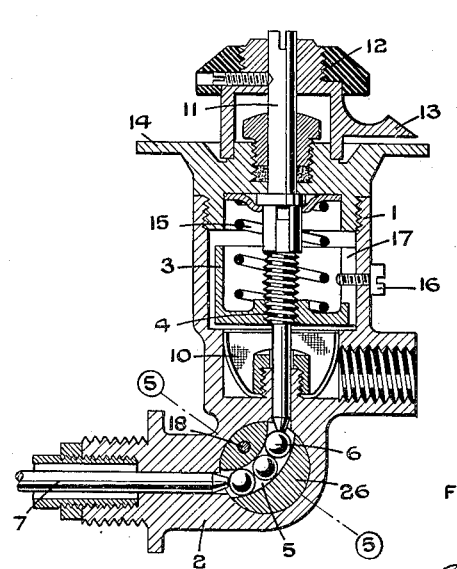
Figure 1 is a vertical section of one construction of gas regulator valve showing my invention applied thereto.
Figure 3:
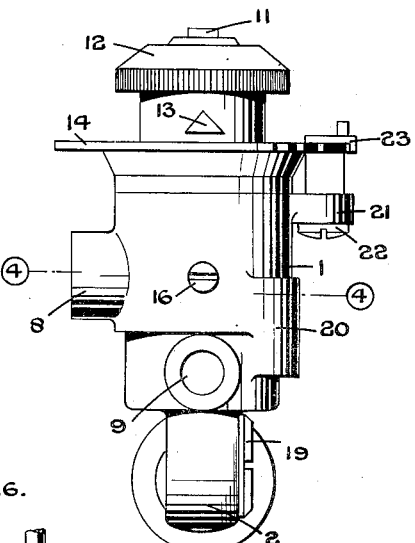
Figure 3 is an end view.

In the construction illustrated by Figures 1 to 5 of the accompanying drawings, the valve box or casing 1 is of cylindrical form and is provided at its lower end with a portion 2 disposed substantially at right angles thereto, the portions 1 and 2 being connected together by means of an intermediate neck.

Mounted within the valve box or casing 1 is a valve 3 of substantially cylindrical form closed at its lower end and having a serrated periphery, the valve being mounted upon an axially arranged valve spindle 4 which is in screw threaded engagement therewith, the valve spindle at its lower end projecting through an opening formed at the lower end of the casing and projecting into the end of a part circular race 5 within which are mounted a number of spherical balls 6 which serve to transmit pressure from the central member 7 of the thermostat to the lower end of the valve spindle.

The thermostat is connected to the extremity of the portion 2 of the casing, the extremity of the central member 7 engaging with the endmost ball.

The casing is provided with inlet and outlet openings 8 and 9, a grid or strainer member 10 of substantially conical form being provided within the casing adjacent the outlet passage.

The upper end of the valve spindle 4 is of non-circular construction and is adapted to be engaged by the slotted extremity of an operating spindle 11 which is provided at its upper end with an operating knob or member 12 whereby it may be rotated.

The operating nut or member is also provided at its lower end with a pointer 13 adapted to co-operate with a fixed graduated scale 14 which is formed by a cap adapted to screw into the upper end of the valve box or casing and virtually forms a cover therefor, the cover at its centre being provided with a suitable gland nut through which the operating spindle 11 is adapted to project.

The valve 3 is normally retained in position upon its seating by means of a coiled spring 15, the valve being prevented from relative rotation with respect to the casing by means of the engagement of a set screw 16 extending inwardly into the interior of the casing and passing through a slot 17 formed in the wall of the valve.

The ball race 5 may, if desired, be formed of a different metal to that forming the casing proper and may be in the form of a circular block or disc 26 having a part circular slot extending across one of its faces, the disc being mounted within a circular recess formed in the neck portion of the casing and secured in position by means of a screw 18.

Figure 5:
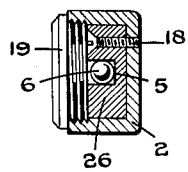
Figure 5 is a section on the line 5—5 in Figure 1.

The recess containing the part circular ball race 5 as shown clearly in Figures 1 and 5 may be closed by means of a detachable screw threaded cap 19.

The casing 1 is also preferably provided with a small by-pass 20 to allow of the passage of a small quantity of gas even when the main valve is closed.

At the upper end of the casing is provided a lug 21 through which passes a set screw 22 engaging with a member 23 in fixed relationship with a graduated disc 14.

The member 23 also serves as a stop to limit the turning movement of the operating member 12, the pointer 13 co-operating with the stop 23.

By this arrangement any possibility of the valve being wrongly readjusted or recalibrated after it has been removed for cleaning purposes, is avoided.

Figure 6:
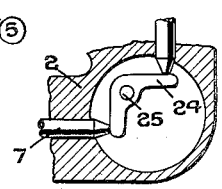
Figure 6 is a sectional view showing a modification.
Figure 2:
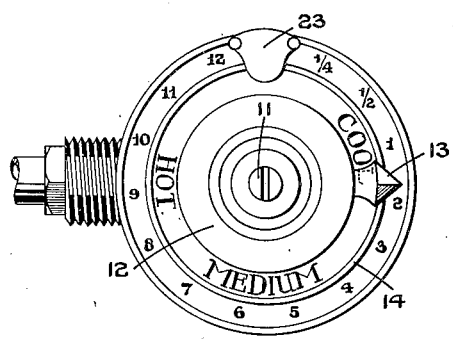
Figure 2 is a plan view of same.
Figure 4:
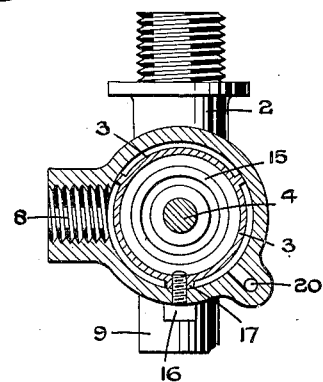
Figure 4 is a section on the line 4—4 in Figure 3.

If desired, instead of a ball race being provided intermediate the valve spindle and thermostat any other suitable mechanical connection may be substituted, such as the bell crank lever 24 shown in Figure 6 or other suitable device.

If a bell crank lever is employed the casing is provided with a pivot pin 25 upon which it is mounted.

What I claim then is:—

1. Automatic control apparatus for gas burners comprising a casing having inlet and outlet passages and a valve seat intermediate said passages, a valve co-operating with said seat to control the flow of gas through the casing, a valve spindle having a screw thread engagement with said valve, means for preventing the rotation of the valve, operating means for said valve spindle, a pointer and scale associated with said operating means, a thermostat arranged transversely with respect to said valve spindle, and a mechanical connection between said thermostat and the valve spindle.

2. Automatic control apparatus for gas burners comprising a casing having inlet and outlet passages and a valve seat intermediate said passages, a valve co-operating with said seat to control the flow of gas through the casing, a valve spindle having a screw thread engagement with said valve, means for preventing the rotation of the valve, a screwed cap closing the end of said casing, an operating spindle passing through said cap, and having driving engagement with said valve spindle, said cap having a scale marked thereon, a pointer associated with the operating spindle and co-operating with said scale, means for definitely locating said cap in relation to the casing, a thermostat arranged transversely with respect to said valve spindle, and a mechanical connection between said thermostat and the valve spindle.

3. Automatic control apparatus for gas burners comprising a casing having inlet and outlet passages and a valve seat intermediate said passages, a valve co-operating with said seat to control the flow of gas through the casing, a valve spindle having a screw thread engagement with said valve, means for preventing the rotation of the valve, a screwed cap closing the end of said casing, an operating spindle passing through said cap, and having driving engagement with said valve spindle, said cap having a scale marked thereon, a pointer associated with the operating spindle and co-operating with said scale, means for definitely locating said cap in relation to the casing, a stop in said cap co-operating with the pointer, a thermostat arranged transversely with respect to said valve spindle, and a mechanical connection between said thermostat and the valve spindle.

4. Automatic control apparatus for gas burners comprising a casing having inlet and outlet passages and a valve seat intermediate said passages, a valve co-operating with said seat to control the flow of gas through the casing, a valve spindle having a screw thread engagement with said valve, means for preventing the rotation of the valve, a spring acting upon said valve and tending to close it, a thermostat arranged transversely with respect to said valve spindle, and a mechanical connection between said thermostat and the valve spindle.

5. Automatic control apparatus for gas burners comprising a casing having inlet and outlet passages and a valve seat intermediate said passages, a valve co-operating with said seat to control the flow of gas through the casing, a valve spindle having a screw thread engagement with said valve, means for preventing the rotation of the valve, a spring acting upon said valve and tending to close it, a screwed cap closing the end of said casing, an operating spindle passing through said cap, and having driving engagement with said valve spindle, said cap having a scale marked thereon, a pointer associated with the operating spindle and cooperating with said scale, a thermostat arranged transversely with respect to said valve spindle, a block secured in a recess in the casing and disposed between the ends of the thermostat and valve spindle, said block having a groove forming a guideway and balls in said guideway forming a mechanical connection between said thermostat and the valve spindle.

6. Automatic control apparatus for gas burners comprising a casing having inlet and outlet passages, and a valve seat intermediate said passages, a valve cooperating with said seat to control the flow of gas through the casing, means, including a valve spindle for adjusting the position of the valve in relation to the seat, a thermostat guided in said casing, said casing having a recess in its side disposed between the ends of the thermostat and the valve spindle, a block in said recess, said block having a groove forming a guideway, and thrust transmitting means in said guideway forming a mechanical connection between said thermostat and the valve spindle.

In witness whereof I affix my signature.

JAMES DOLPHIN.